United States Patent [19]

Inagaki

[11] Patent Number: 4,674,953

[45] Date of Patent: Jun. 23, 1987

[54] MULTISTAGE HYDRAULIC MACHINES

[75] Inventor: Taizo Inagaki, Yokohama, Japan

[73] Assignee: Kabushiki Kaisha Toshiba, Kawasaki, Japan

[21] Appl. No.: 706,190

[22] Filed: Feb. 27, 1985

[30] Foreign Application Priority Data

Feb. 28, 1984 [JP]  Japan .................................. 59-36480

[51] Int. Cl.$^4$ ........................................... F04D 29/60
[52] U.S. Cl. ..................................... 415/201; 415/118; 415/DIG. 3
[58] Field of Search ............. 415/1, 201, 118, DIG. 3, 415/199.2, 198.1, 199.1, 500, 501; 416/198 R, 198 A, 199, 201 R, 201 A

[56] References Cited

U.S. PATENT DOCUMENTS

| | | | |
|---|---|---|---|
| 1,978,814 | 10/1934 | Myers | 415/501 |
| 2,434,018 | 1/1948 | Stepanoff | 415/213 |
| 3,163,118 | 12/1964 | Baumann | 415/500 |
| 3,540,834 | 11/1970 | Allerton | 415/219 C |
| 3,713,749 | 1/1973 | Fitch | 415/201 |
| 4,083,259 | 4/1978 | Seliger et al. | 415/201 |
| 4,431,370 | 2/1984 | Ichikawa et al. | 415/1 |
| 4,563,130 | 1/1986 | Ichikawa et al. | 415/198.1 |

FOREIGN PATENT DOCUMENTS

| | | | |
|---|---|---|---|
| 1174557 | 3/1959 | France | 415/201 |
| 56-115867 | 9/1981 | Japan . | |
| 312364 | 3/1956 | Switzerland | 415/131 |
| 571205 | 8/1945 | United Kingdom | 416/198 |
| 844105 | 8/1960 | United Kingdom | 415/201 |

Primary Examiner—Robert E. Garrett
Assistant Examiner—John Kwon
Attorney, Agent, or Firm—Oblon, Fisher, Spivak, McClelland & Maier

[57] ABSTRACT

A multistage hydraulic machine is vertically positioned within a pit. The main shaft of the machine is divided into an upper main shaft and a lower main shaft at the location of the lowest pressure stage runner. A side path is provided laterally from the pit so that the lowest pressure stage runner and lower main shaft can be installed and removed through the side path.

7 Claims, 4 Drawing Figures

MULTISTAGE HYDRAULIC MACHINES

BACKGROUND OF THE INVENTION

1. Field of the Invention:

This invention relates to multistage hydraulic machines and more particularly to multistage hydraulic machines so constructed that the main shaft is capable of being divided into an upper main shaft and lower main shaft at the location of the lowest pressure stage runner, and the lowest pressure stage runner and lower main shaft can be installed or removed through a path at the side of the pit.

2. Background of the Related Art:

In general, with increases in the capacity and head of pumping-up power stations, the limitations, both from the point of view of efficiency and from the point of view of manufacture, of single-stage hydraulic machines are exceeded and it becomes necessary to employ multi-stage hydraulic machines. The main shaft of such multistage hydraulic machines tends to be longer than that of a single-stage hydraulic machine since the multistage machine has a plurality of runners mounted with a separation in the axial direction on the main shaft. This increases the external hydraulic force that acts on this plurality of runners during operation. The result is that a guide bearing at a single location near the runner, as is done in a single-stage hydraulic machine, no longer provides sufficient support strength. Previous practice has therefore been to support the main shaft by the provision of a bottom guide bearing around the main shaft at the point where it passes through the draft tube from the lowest pressure stage runner.

When the main shaft of the hydraulic machine reaches such a length, centering and machining of the main shaft gets difficult, and there are various restrictions on transporting the shaft from the factory to the installation site after machining. Also, when the main shaft of a hydraulic machine gets long, the following problems arise regarding its installation in the power station and its maintenance. Specifically, when assembling the hydraulic machine at the power station or when dismantling it for maintenance and inspection, the main shaft must be raised together with the runners of each stage using a crane in the power station building. This means that the crane has to be of large capacity and the height of the building has to be increased, as a natural consequence of the need to provide a large lifting height below the crane for the long main shaft of the hydraulic machine. The building therefore has to be of very strong construction, increasing its construction cost.

Furthermore, in a multistage hydraulic machine, the lowest pressure stage runner and the portion of the main shaft that extends below this lowest pressure stage runner are more liable than the high pressure stage runners to be damaged due to cavitation and abrasive damage due to earth and sand.

The repair or replacement frequency of the lowest pressure stage runner and the part of the shaft extending below it therefore tends to be higher than that for other parts.

Thus, when a one piece main shaft is used, every time it is dismantled, all the structural items such as the top cover, guide vane opening and closing mechanism, or return vanes must also be dismantled. Also, on reassembly, the same installation work is required as when the power station was initially commissioned, involving extensive centering and locating operations, and so requiring enormous amounts of time, labor and expense for such dismantling and assembly.

Also, when the portion of the integrally constructed main shaft that extends below the lowest pressure stage runner is damaged, occasionaly the whole main shaft must be replaced by a new one, thus requiring enomous amounts of expense for such replacement.

SUMMARY OF THE INVENTION

The object of this invention is to provide a multistage hydraulic machine wherein the power station building construction costs and equipment costs can be reduced, and maintenance costs of the hydraulic machine can be decreased, by forming the main shaft such that it can be divided into an upper main shaft and lower main shaft, and arranging the machine such that the lowest pressure stage runner and the lower main shaft can be dismantled and assembled from below.

In order to achieve the above object, the invention includes a main shaft so constructed that it can be divided into an upper main shaft and lower main shaft, one or two or more high pressure stage runners mounted on this upper main shaft, a lowest pressure stage runner gripped between the upper main shaft and lower main shaft, a return flow path that communicates with the respective flow paths of the high pressure stage runners and the lowest pressure stage runner, a pit wherein are installed the main shaft, high pressure stage runners, the lowest pressure stage runner and the return flow path, and a side path formed at the side of this pit such that the lowest pressure stage runner and the lower main shaft can be brought in from, or removed to, the outside.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
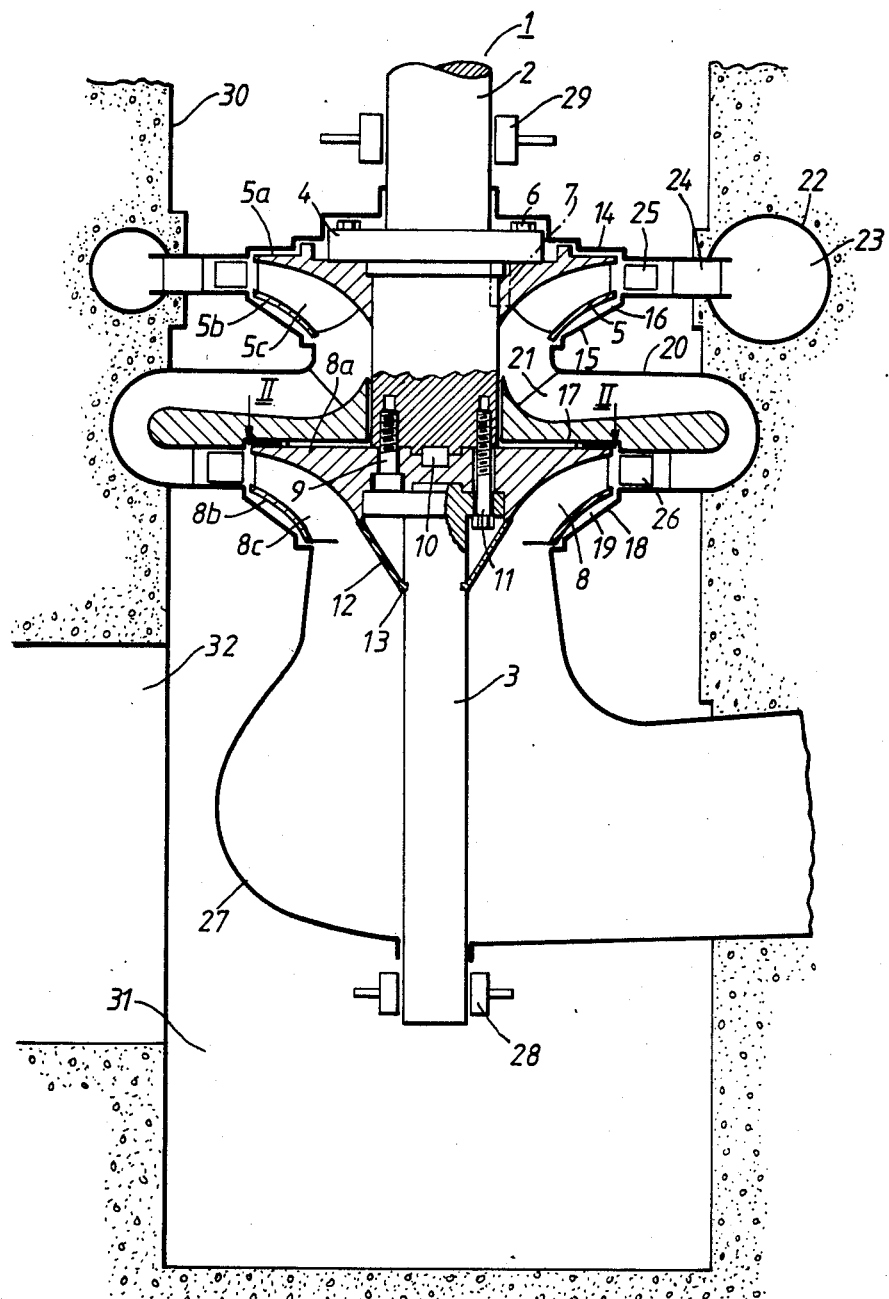
FIG. 1 is an axial cross section showing a two-stage pump turbine according to an embodiment this invention.

An embodiment of a multistage hydraulic machine according to this invention is described below with reference to the drawing.

FIG. 1 shows an example of the invention applied to a 2-stage pump-turbine. The main shaft 1 of this 2-stage pump-turbine is constituted by an upper main shaft 2 and lower main shaft 3.

A flange 4 is integrally formed around the upper main shaft 2. The high pressure stage runner 5 is fixed by bolts 6 to the bottom face of this flange 4. This high pressure stage runner 5 consists of a runner crown 5a and runner band 5b and a plurality of runner vanes 5c gripped therebetween. A key 7 is inserted at the gripping face between the upper main shaft 2 and the high pressure stage runner 5.

A lower pressure stage runner 8 is coaxially coupled at the bottom end face of the upper main shaft 2. This lower pressure runner 8 is clamped to the upper main shaft 2 by a plurality of clamping bolts 9 extending through the runner 8 and threaded into bores in the end face of the upper main shaft 2. This lower pressure stage runner 8 consists of a runner vanes 8c gripped between runner crown 5a and runner band 5b. A key 10 is provided at the joint face of the end face of the upper main shaft 2 and the lower pressure stage runner 8.

The lower main shaft 3 is joined to the runner cone portion of the lower pressure stage runner 8, and fixed to the upper main shaft 2 by means of clamping bolts 11 that pass through the lower pressure stage runner 8.

Figure 2:
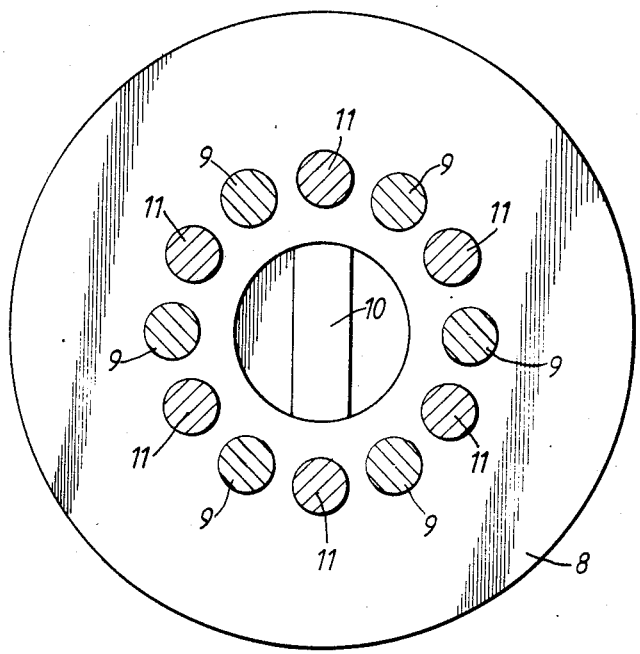
FIG. 2 is a cross section along the line II—II of FIG. 1.

As shown in FIG. 2, these clamping bolts 11 and the clamping bolts 9 are arranged alternately on the same circle. The heads of the clamping bolts 11 project downwardly and so could act as a resistance to the water flow. To prevent this, a cone-shaped cover 12 is installed, whose upper end is fixed to the runner 8 and whose lower end is fixed by a ring key 13 onto the lower main shaft 3.

The crown side of the high pressure stage runner 5 is covered by a top cover 14 and the band side is covered by a bottom cover 15, so that a high pressure stage runner chamber 16 is formed therebetween.

The crown side of the lower pressure stage runner 8 is covered by a top cover 17 and the band side is covered by a bottom cover 18, so that a lower pressure stage runner chamber 19 is formed therebetween. The high pressure stage runner chamber 16 and lower pressure stage runner chamber 19 are connected by a return passage 20, and a plurality of return vanes 21 are arranged in this return passage 20.

A spiral casing 22 is arranged outside the high pressure stage runner chamber 16. Its spiral chamber 23 communicates with the high pressure stage runner chamber 16. The inlet of the spiral chamber 23 is connected to a penstock through an inlet valve, not shown.

Stay vanes 24 are arranged outside the flow path connecting the spiral chamber 23 and high pressure stage runner chamber 16. Inside this flow path there are arranged movable guide vanes 25 in the form of a circular array of vanes to enable the amount of water flowing into the high pressure runner chamber 16 to be regulated.

A circular array of movable guide vanes 26 whose degree of opening can be altered is also arranged around the periphery of the lower pressure stage runner 8.

An elbow-shaped draft tube 27 is connected to the bottom cover 18 of the lower pressure stage runner chamber 19. The lower main shaft 3 extends downwards while passing through this draft tube 27, and the bottom end of this lower main shaft 3 is supported by a lower guide bearing 28. The upper main shaft 2 is supported by an upper guide bearing 29.

When a 2-stage pump turbine constructed as above is to be installed in a power station, as shown in FIG. 1, it is positioned in a pit 30 constructed of concrete. This pit 30 is formed with a side path 32 in the form of a horizontal passage communicating with pit 30 at the side of the draft tube 27, and has a lower work chamber 31 for maintenance purposes below the draft tube 27.

Figure 3:
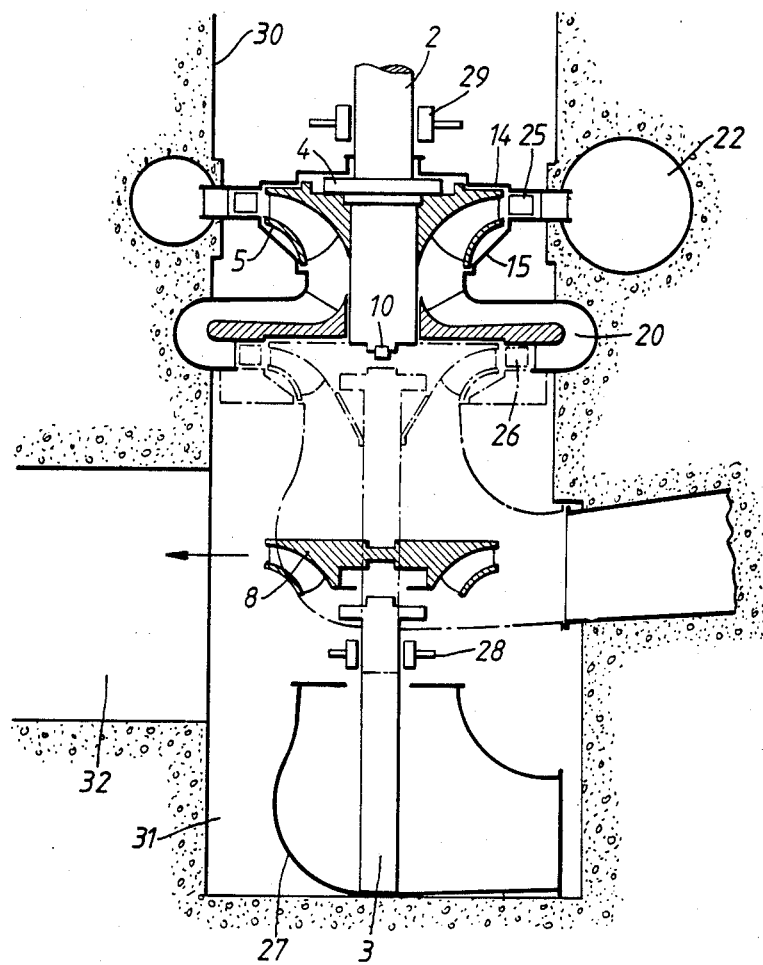
FIG. 3 is an axial cross section showing the low pressure stage runner in dismantled condition.
Figure 4:
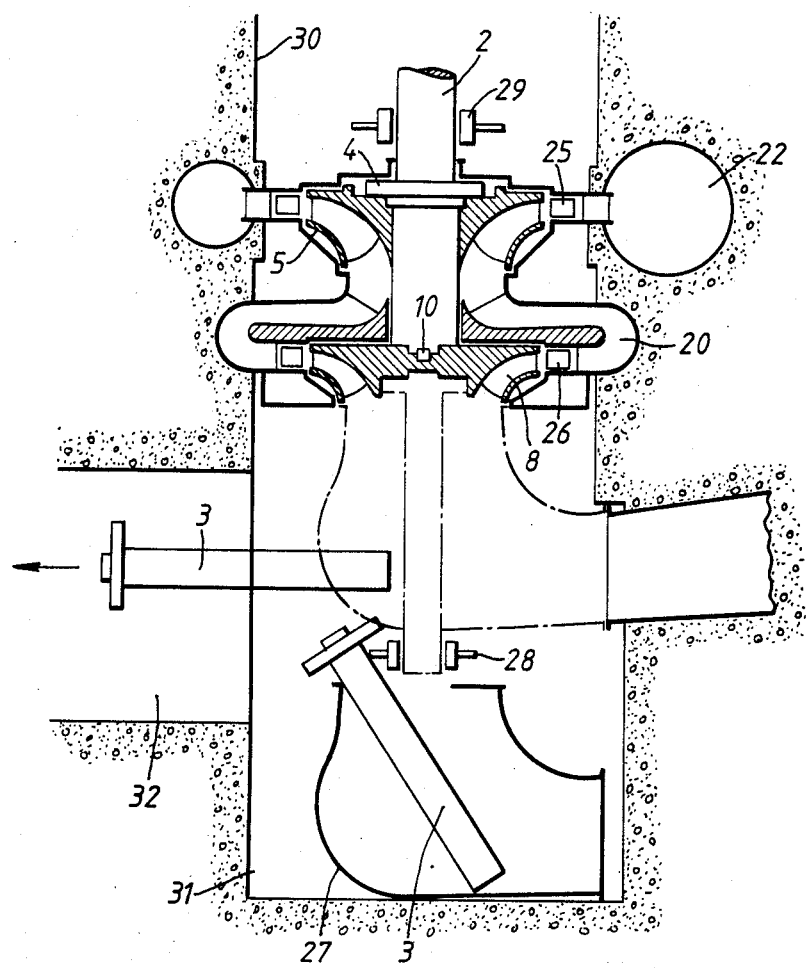
FIG. 4 is an axial cross section showing the pump-turbine when the lower main shaft is moved out.

The sequence of operations involved in dismantling the lower-stage runner 8 and lower main shaft 3 of a 2-stage pump-turbine constructed as above will now be described with reference to FIGS. 3 and 4.

First of all, the water is completely drained from the draft tube 27. The lower guide bearing 28 is then dismantled, and part of the draft tube 27 is released from the bottom cover 18, and lowered to the floor of the lower work chamber 31 of the pit 30, as shown in FIG. 3. Next, the ring key 13 is removed and the cover 12 removed. The clamping bolts 11 are then successively released, and the lower main shaft 3 lowered to the floor of the work chamber 31. The bottom cover 18 is then removed and the clamping bolts 9 successively released to remove the lower pressure stage runner 8. This is then lowered to the position shown in FIG. 3, where it is supported horizontally by jacks etc. before being taken out through the side path 32 of the pit 30. If required, the lower pressure stage runner 8 can in fact be dismantled and moved out in separate pieces. The lower main shaft 3 is then tipped over to a horizontal position as shown so that it can be removed to the outside through the side path 32. Thus dismantling of the lower pressure stage runner and lower main shaft for inspection and repair can be performed without dismantling the upper main shaft.

For assembly, the above procedure is carried out in reverse.

As will be clear from the above description, since, in this invention, the main shaft is constructed of upper and lower shafts that can be dismantled or coupled together at the position of the lowest pressure stage runner, dismantling and assembly for purposes of inspection and maintenance of the lowest pressure runner and the lower main shaft can be performed easily without dismantling the upper main shaft and higher-stage runners, because the lower main shaft etc. can be moved out through a side path in the pit. Thus the time for dismantling and assembly can be shortened and the resulting work costs decreased since it is possible to dismantle and reassemble the lowest pressure stage runner only, without the need to dismantle the higher pressure stage runners. Also, the power station building can be made compact since the crane installed in the building does not need to have as great a lifting height, and equipment costs can be lowered since the capacity of the crane can be reduced.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A multistage hydraulic machine comprising:
   a pit;
   at least one upper stage runner in said pit;
   a lower stage runner in said pit;
   a return passage connecting adjacent ones of said runners;
   a bottom cover for said lower stage runner;
   an elbow shaped draft tube in said pit and connected to said bottom cover;
   a side path extending laterally from said pit substantially as a level of said draft tube; and a rotatable main shaft rotatably mounted in said pit and rotationally fixed to said upper and lower stage runners, wherein said main shaft comprises an upper main shaft fixed to said at least one upper stage runner and fixed to said lower stage runner by releasable first fixing means, and a lower main shaft fixed to said lower stage runner by releasable second fixing means and separate from said upper main shaft, said lower main shaft extending through said draft tube, wherein said first fixing means comprise a first circular array of first bolts extending through said lower stage runner and into said upper main shaft, and wherein said second fixing means comprise a second circular array of second bolts extending through said lower stage runner and a flage of said lower main shaft and into said upper main shaft, said second bolts having heads extending into said draft tube, said first and second array forming a circle with alternating first and second bolts.

2. The machine of claim 1 including at least a lower main shaft bearing positioned below said draft tube.

3. The machine of claim 1 wherein said upper main shaft is fixed to an upper surface of said lower stage runner by said first fixing means and said lower main shaft is fixed to a lower surface of said lower stage runner by said second fixing means.

4. The machine of claim 1 including a cone shaped cover connecting said lower stage runner and a portion of said lower main shaft in said draft tube, whereby said second bolts are out of a flow path of water in said draft tube.

5. The machine of claim 1 wherein said first fixing means also comprise a key fitted between said lower stage runner upper surface and said upper main shaft.

6. The machine of claim 1 wherein said side path is sufficiently large to permit passage of said lower main shaft.

7. The machine of claim 1 wherein said main shaft extends in a vertical direction.

* * * * *